United States Patent [19]
Haferl et al.

[11] Patent Number: 4,682,085
[45] Date of Patent: Jul. 21, 1987

[54] GULLWING DISTORTION CORRECTED DEFLECTION CIRCUITRY FOR A SQUARE-PLANAR PICTURE TUBE

[75] Inventors: Peter E. Haferl, Adliswil, Switzerland; Hugh F. Sutherland, II; David W. Luz, both of Indianapolis, Ind.; James A. McDonald; George C. Waybright, both of Carmel, Ind.; Donald H. Willis, Indianapolis, Ind.

[73] Assignee: RCA Corporation, Princeton, N.J.

[21] Appl. No.: 733,661

[22] Filed: May 10, 1985

[30] Foreign Application Priority Data

Jun. 12, 1984 [GB] United Kingdom ............... 8414946
Jun. 12, 1984 [GB] United Kingdom ............... 8414947

[51] Int. Cl.⁴ ............................................. H01J 29/56
[52] U.S. Cl. ..................................... 315/371; 315/368
[58] Field of Search ....................... 315/368, 370, 371

[56] References Cited

U.S. PATENT DOCUMENTS 4,329,671  5/1982  Gross et al. ................... 335/213

FOREIGN PATENT DOCUMENTS 2010814  9/1971  Fed. Rep. of Germany .
1554404  10/1979  United Kingdom .

OTHER PUBLICATIONS

"RCA Solid State '74 Databook Series-SSD-202B", Application Note ICAN-6668, dated 11/73, entitled Applications of the CA3080 and CA3080A High-Performance Operational Transconductance Amplifiers, pp. 63–78.
"Telefunken Sprecher", No. 68, Feb. 1976, pp. 3–33.

Primary Examiner—Theodore M. Blum
Assistant Examiner—David Cain
Attorney, Agent, or Firm—Eugene M. Whitacre; Paul J. Rasmussen; Joseph J. Laks

[57] ABSTRACT

Line and field deflection circuits generate line and field deflection currents in respective line and field deflection windings to scan a raster on the phosphor screen of a square-planar picture tube having an aspherical faceplate. The asphericity of the faceplate subjects the scanned raster to gullwing distortion. A gullwing distortion correction circuit is responsive to signals repeating at line and field rates, respectively, for modulating the field deflection current during a line deflection period within the field deflection trace interval in a manner that corrects gullwing distortion of a corresponding raster scan line.

31 Claims, 15 Drawing Figures

GULLWING DISTORTION CORRECTED DEFLECTION CIRCUITRY FOR A SQUARE-PLANAR PICTURE TUBE

This invention relates to gullwing distortion corrected deflection circuits.

New, flatter faceplate picture tubes, such as the RCA Corporation square-planar picture tubes have aspherical faceplate curvatures. A tube of this type, having a complex curvature faceplate, is described in the following U.S. patent applications, herein incorporated by reference.

1. U.S. patent application Ser. No. 469,772, filed Feb. 25, 1983, in the name of F. R. Ragland, Jr. and entitled, Cathode-Ray Tube having an Improved Shadow Mask Contour.

2. U.S. patent application Ser. No. 469,774, filed Feb. 25, 1983 in the name of F. R. Ragland, Jr. and entitled, Cathode-Ray Tube having a Faceplate Panel with a Substantially Planar Periphery.

3. U.S. patent application Ser. No. 469,775, filed Feb. 25, 1983, in the names of R. J. D'Amato et al., and entitled, Cathode-Ray Tube having Different Curvature Along Major and Minor Axes.

4. U.S. patent application Ser. No. 529,644, filed Sept. 6, 1983, in the names of R. J. D'Amato et al., and entitled, Cathode-Ray Tube having a Faceplate Panel with an Essentially Planar Screen Periphery.

In one form of flatter faceplate picture tube, as typified by the RCA 110° COTY-SP, square-planar, 27V, color television picture tube, A68ACC10X, the formula for the tube faceplate sagittal height, z, in millimeters, with reference to the center of the faceplate is given by:

$$Z = A_1 X^2 + A_2 X^4 + A_3 Y^2 + A_4 X^2 Y^2 + A_5 X^4 Y^2 + A_6 Y^4 + A_7 X^2 Y^4 + A_8 X^4 Y^4,$$

where X and Y are the distance coordinates, in millimeters, from the faceplate center along the major and minor axes, respectively, and where:

$A_1 = -0.236424229 \times 10^{-4}$
$A_2 = -0.363538575 \times 10^{-8}$
$A_3 = -0.422441063 \times 10^{-3}$
$A_4 = -0.213537355 \times 10^{-8}$
$A_5 = +0.883912220 \times 10^{-13}$
$A_6 = -0.100020398 \times 10^{-9}$
$A_7 = +0.117915353 \times 10^{-14}$
$A_8 = +0.527722295 \times 10^{-21}$ The picture tube faceplate defined by this formula has a relatively shallow curvature near the center of the faceplate, which increases near the edges along paths parallel to both the major and minor axes of the tube. The overall result is a faceplate of relatively flat appearance and with planar edges, namely, with points along the top, bottom, right and left edges located substantially in a common plane.

Figure 1:
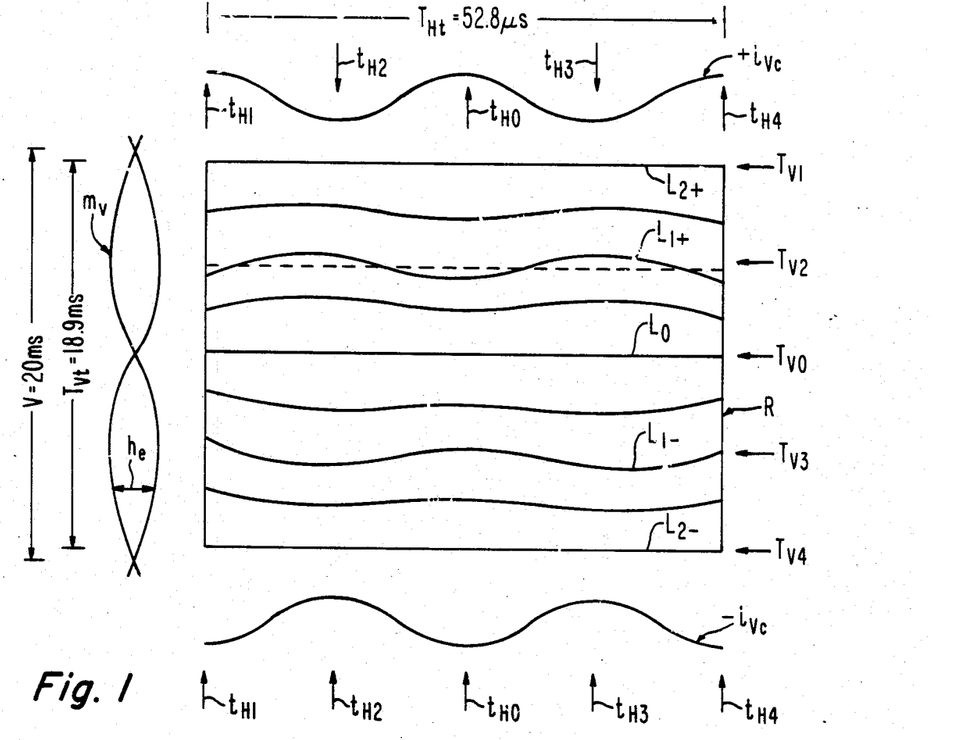
FIG. 1 illustrates the raster pattern of gullwing distortion appearing on the aspherical faceplate of a square-planar picture tube.

Such picture tubes may require modulation of the field deflection current for correcting a geometrical distortion defined as gullwing distortion, illustrated by the raster lines of FIG. 1. A cause of this distortion is the difference between the beam scanning radius of curvature and the tube faceplate radius of curvature as the electron beams scan a raster pattern.

Figure 2:
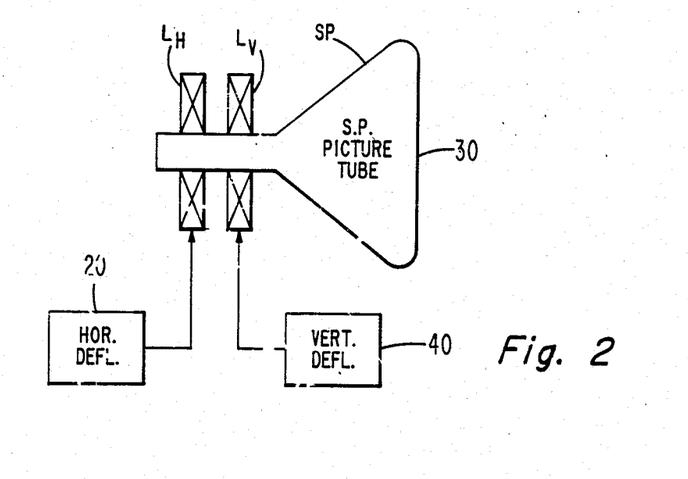
FIG. 2 illustrates in block diagram form raster scanning circuitry used in conjunction with raster scanning on the aspherical faceplate of a square-planar picture tube.

In FIG. 1, a raster area R is schematically represented by a rectangular box that encompasses the viewing area of faceplate 30 of a square-planar picture tube SP of FIG. 2. Horizontal and vertical deflection circuits 20 and 40 of FIG. 2 generate horizontal and vertical deflection currents in horizontal and vertical deflection windings $L_H$ and $L_V$, respectively. The horizontal and vertical deflection currents produce a pattern of scanned raster lines on faceplate 30.

Assuming that horizontal and vertical deflection circuits 20 and 40 correct for distortions such as east-west, north-south and S-distortion, the display of a pattern of horizontal raster scan lines on faceplate 30 is illustrated in FIG. 1. The raster scan lines of FIG. 1 exhibit a residual distortion identified as gullwing distortion.

In gullwing distortion, the vertical deviation of the electron beams scanning a given raster line, such as line $L_{1+}$, undergoes approximately two cycles of oscillation about their straight, dashed-line position in FIG. 1. During the first half of the vertical trace interval, between time $T_{V1}$ and time $T_{V0}$, the vertical deviation of each raster line scan produces an upward excursion at intermediate points of a given line scan, near times $t_{H2}$ and $t_{H3}$ of the line trace interval, $T_{Ht}$. Maximum downward excursion of each raster line scan during the top half of vertical trace occurs at the beginning, center and end of each line scan, corresponding to times $t_{H1}$, $t_{H0}$ and $t_{H4}$, respectively.

Additionally, in gullwing distortion, the phase of the deviations of a given raster line switches by 180° when scanning from the top half of the raster to the bottom half of the raster. Thus the phase of the deviations of raster line $L_{1-}$, scanned at vertical instant $T_{V3}$, is inverted in phase relative to the excursions of the corresponding raster line $L_{1+}$, scanned at vertical instant $T_{V2}$.

When horizontal and vertical deflection circuits 20 and 40 are used in conjunction with raster scanning on faceplate 30 of square-planar picture tube SP of FIG. 2, the effects of gullwing distortion on raster R of FIG. 1 varies during the vertical trace interval $T_{Vt}$. Gullwing distortion is at a maximum for raster lines scanned at times intermediate the center of vertical trace and the beginning or end of vertical trace. Thus, maximum gullwing distortion or maximum deviation of a raster line occurs when scanning raster lines $L_{1+}$ and $L_{1-}$ during vertical scan instants $T_{V2}$ and $T_{V3}$.

Minimum or no gullwing distortion of the raster scan lines is associated with line scanning at the top, center and bottom of the raster, when scanning raster lines $L_{2+}$, $L_0$ and $L_{2-}$, during vertical scan instants $T_{V1}$, $T_{V0}$ and $T_{V4}$, respectively.

In accordance with an aspect of the invention, gullwing distortion that tends to occur in conjunction with raster scanning of an aspherical faceplate picture tube is compensated by a correction circuit that modulates the field deflection current. The gullwing correction circuit is responsive to a first signal that repeats at a line rate and to a second signal that repeats at a field rate for modulating the field deflection current during a line deflection period within the field deflection trace interval. The modulation is properly phased to correct the gullwing distortion.

Figure 3:
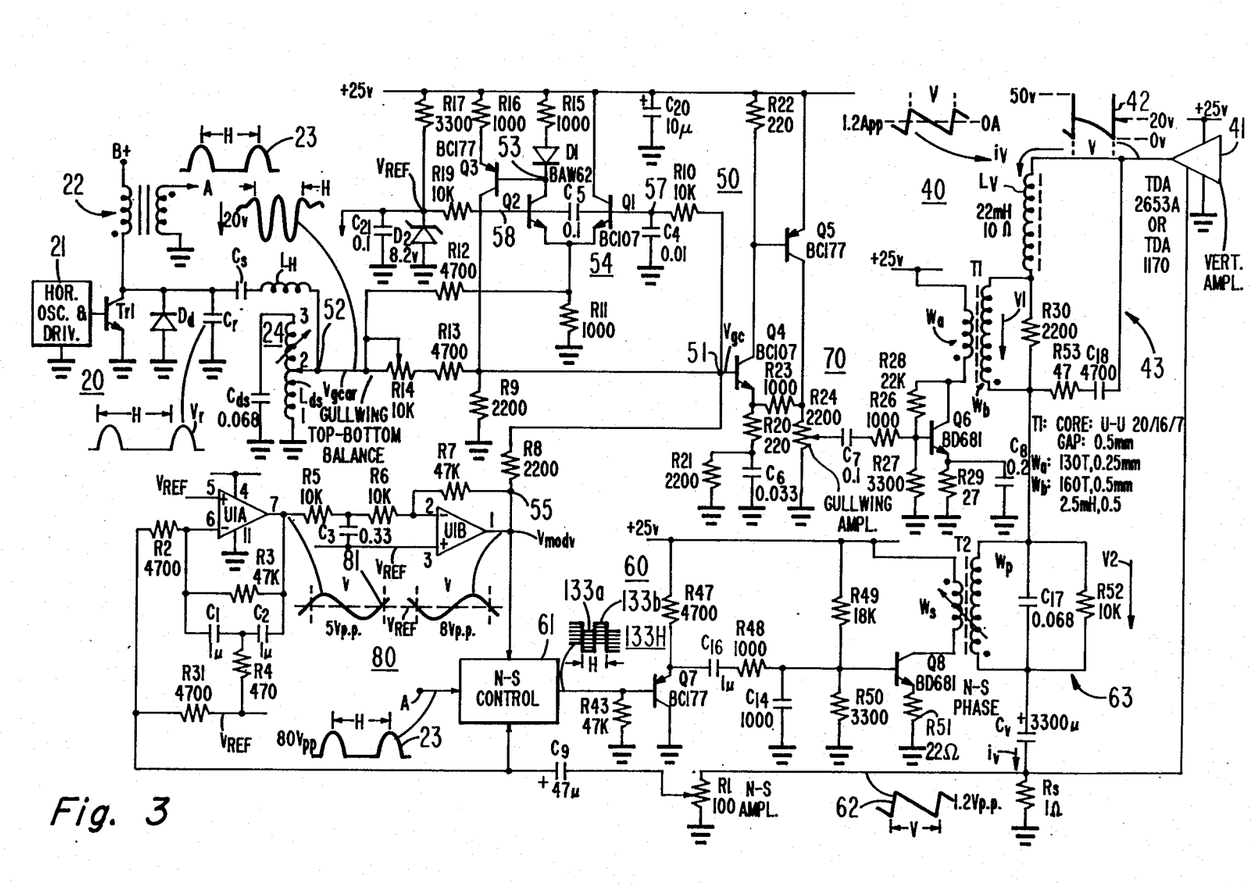
FIG. 3 illustrates detailed embodiments of the horizontal and vertical deflection circuits of FIG. 2, including circuitry embodying the invention that corrects for gullwing distortion.

In the deflection circuitry illustrated in FIG. 3, a vertical deflection circuit 40 includes a vertical deflection amplifier 41 that applies a vertical output voltage 42 for generating vertical deflection current $i_V$ in a vertical deflection winding $L_V$. A gullwing distortion correction circuit 70, embodying the invention, modulates vertical deflection current $i_V$ by applying a gullwing modulation voltage $V_1$ to vertical deflection winding $L_V$. To provide north-south pincushion raster distortion correction, a north-south pincushion correction circuit 60 modulates vertical deflection current $i_V$ by applying to vertical deflection winding $L_V$ a north-south correction voltage $V_2$. Vertical deflection current $i_V$ flows a ground via a coupling capacitor $C_V$ and a current sampling resistor $R_s$.

To correct gullwing raster distortion, gullwing correction circuit 70 modulates vertical deflection current $i_V$ during each line deflection period within the field deflection trace interval in the manner illustrated by the current $i_{Vc}$, illustrated in FIG. 1 by the two current waveforms $-i_{Vc}$. Current $i_{Vc}$ represents a line repetitive modulation component of the vertical deflection current wherein approximately two cycles of oscillation of modulation current $i_{Vc}$ is developed during the line trace interval $T_{Ht}$.

To correct gullwing distortion of the raster lines, the modulation current component $i_{Vc}$ is 180° out-of-phase with the oscillatory vertical deviations of the corresponding raster lines. Thus, for the lines scanned in the top half of the raster, such as raster line $L_{1+}$, modulation current component $+i_{Vc}$ reaches its negative minima AC-wise near the line trace instants $t_{H2}$ and $t_{H3}$, and reaches its positive maxima near times $t_{H1}$, $t_{H0}$ and $t_{H4}$. For lines scanned in the bottom half of raster R, the modulation current component is the phase inverted current $-i_{Vc}$, reaching maxima near times $t_{H2}$ and $t_{H3}$ and minima near times $t_{H1}$, $t_{H0}$ and $t_{H4}$.

In addition, to provide ideal gullwing distortion correction of a raster displayed on the aspherical faceplate of a square-planar picture tube, the amplitude envelope $m_V$ of modulation current component $i_{Vc}$ is varied in envelope height $h_e$ during the vertical trace interval $T_{Vt}$ in the manner illustrated in FIG. 1. The height of the modulation envelope undergoes approximately two cycles of oscillation, achieving maximum height near times $T_{V2}$ and $T_{V3}$, corresponding to the scanning of raster lines $L_{1+}$ and $L_{1-}$. The modulation envelope reaches zero or near zero height near the center of vertical trace, time $T_{V0}$, when scanning raster line $L_0$ and near the top and bottom of the raster, near times $T_{V1}$ and $T_{V4}$, when scanning raster lines $L_{2+}$ and $L_{2-}$.

To generate modulation current component $i_{Vc}$, having a modulation envelope $m_V$, gullwing correction circuit 70 includes a modulator stage 50 that generates a gullwing modulation voltage $V_{gc}$ at a modulator output terminal 51. Gullwing modulation voltage $V_{gc}$ is amplified in transistors $Q_4$ and $Q_5$ and coupled via a gullwing amplitude control potentiometer $R_{24}$ to an output transistor $Q_6$ advantageously operated in class A mode.

Primary winding $W_a$ of a gullwing transformer T1 is coupled to the collector of output transistor $Q_6$. Secondary winding $W_b$ of transformer T1 generates the gullwing correction voltage $V_1$ that is applied to vertical deflection winding $L_V$ to modulate vertical deflection current $i_V$.

Capacitor $C_6$ coupled to the emitter of transistor $Q_4$ and capacitor $C_8$ coupled to the emitter of transistor $Q_6$ enhance the high frequency response of gullwing correction circuit 70, resulting in an advance of gullwing correction voltage 71 compared to voltage $V_{gc}$. This compensates for the delay between correction voltage $V_1$ and modulation current component $i_{Vc}$ caused by the inductive load at transformer T1. The overall result is that current $i_{Vc}$ is properly phased to provide gullwing correction.

Gullwing modulator 50 in accordance with an aspect of the invention functions as a double balanced modulator that takes a line repetitive carrier voltage $V_{gcar}$ and multiplies that voltage by a field repetitive voltage $V_{modv}$, produced by a vertical waveshaping circuit 80, to generate gullwing modulation voltage $V_{gc}$. Voltage $V_{gcar}$ is used to produce the gullwing modulation component $i_{Vc}$, illustrated in FIG. 1. Voltage $V_{modv}$ is used to produce the modulation envelope $m_V$ of FIG. 1.

In accordance with a feature of the invention, the line repetitive voltage $V_{gcar}$ is derived from an LC resonant circuit 24, within horizontal deflection circuit 20, that is tuned to produce two cycles of resonant oscillation of current and voltage during the trace interval of the line deflection period. Additionally, LC resonant circuit 24 produces one cycle of oscillation during the horizontal retrace interval. Horizontal deflection circuit 20 includes a horizontal oscillator and driver 21, a horizontal output transistor Tr1, a damper didoe $D_d$, a retrace capacitor $C_r$ and the series arrangement of an S-shaping capacitor $C_s$, horizontal deflection winding $L_H$ and LC resonant circuit 24, comprising capacitor $C_{ds}$ and tapped inductor $L_{ds}$.

S-shaping capacitor $C_s$ is incapable of providing full correction of S-distortion when a raster is being scanned on the aspherical faceplate of a square-planar picture tube. LC resonant 24 is tuned to a resonance period of one-half the horizontal trace interval or a resonance frequency of illustratively 38 kilohertz when the horizontal trace interval is 52.6 microsecond in duration. LC resonant circuit 24 applies voltage $V_{gcar}$ to horizontal deflection winding $L_H$ to modify the waveshape of the line deflection current in a manner that corrects for residual S-distortion. The operation of LC resonant circuit 24 is more fully described in U.S. patent application, Ser. No. 716,685 filed Mar. 27, 1985, entitled, S-Corrected Deflection Circuit, by P. E. Haferl, herein incorporated by reference.

Figure 4:
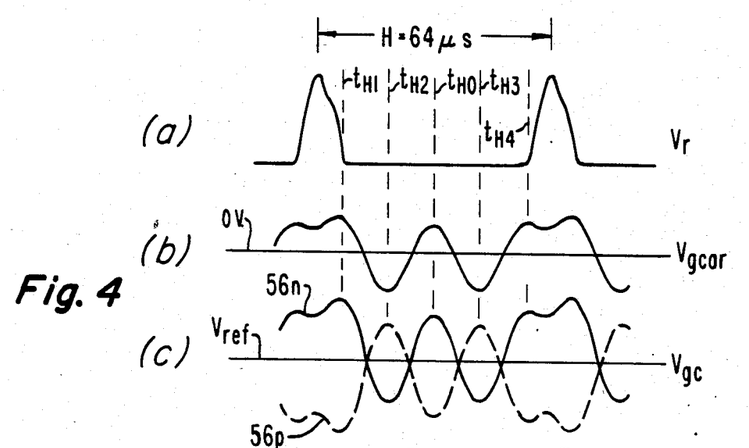
FIGS. 4 and 5 illustrate waveforms associated with the operation of the circuitry of FIG. 3.

Voltage $V_{gcar}$ is illustrated in FIG. 4b and a reference horizontal retrace pulse voltage $V_r$ is illustrated in FIG. 4a. The phasing of voltage $V_{gcar}$ relative to horizontal retrace pulse voltage $V_r$ is such as to produce during the line trace interval, time $t_{H1}$ through time $t_{H4}$, two cycles of oscillation such that waveform maxima occur at times $t_{H1}$, $T_{H0}$ and $t_{H4}$ and waveform minima occur at times $t_{H2}$ and $t_{H3}$.

Voltage $V_{gcar}$ is applied to a carrier signal input terminal of modulator 50. Voltage $V_{modv}$ is coupled to an amplitude modulation signal input terminal 55 of modulator 50. Voltage $V_{modv}$ modulates voltage $V_{gcar}$ to produce the suppressed carrier amplitude modulated gullwing correction voltage $V_{gc}$ at modulator output terminal 51.

Figure 5:
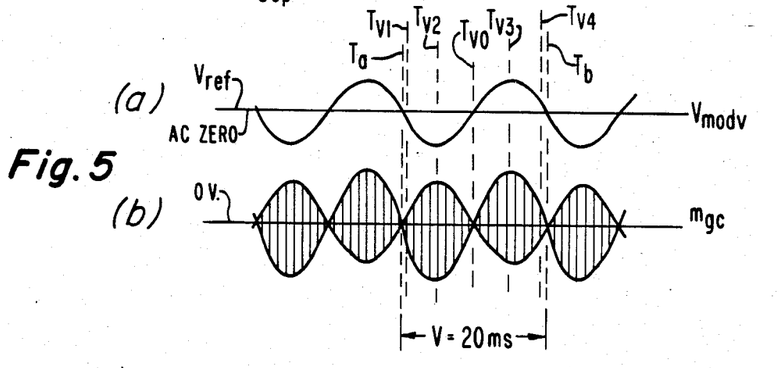

In accordance with another inventive feature, vertical waveshaping circuit 80 develops an approximately sinusoidal waveshape, vertical modulation voltage $V_{modv}$, illustrated in FIG. 5a. To obtain sinusoidal voltage $V_{modv}$, the vertical sawtooth voltage 62 developed across sampling resistor $R_s$ is applied via a potentiometer R1 and a DC blocking capacitor C9 to the inverting input terminal of an operational amplifier U1A. Amplifier U1A operates as a double integrator. The output signal of amplifier U1A is a vertical rate, third order S-shaped waveform 81 that is coupled via an RC network to the inverting input terminal of an operational amplifier U1B for generating the voltage $V_{modv}$. Resistor $R_5$ and capacitor $C_3$ of the RC network provide some delay of signal 81 to enable voltage $V_{modv}$ to be properly centered, with a zero crossing near the center of the vertical trace interval, time $T_{V0}$ of FIG. 5a.

Vertical modulation voltage $V_{modv}$, illustrated in FIG. 5a, developed at modulation input terminal 55 of suppressed carrier modulator 50 modulates the gullwing carrier frequency voltage $V_{gcar}$, illustrated in FIG. 4b, that is developed at carrier input terminal 52 to develop at output terminal 51 modulated gullwing correction voltage $V_{gc}$, illustrated in the line rate time scale of FIG. 4c.

During the top half of raster scanning, prior to the center of field trace instant $T_{V0}$ of FIG. 5a, when modulation voltage $V_{modv}$ is negative, AC-wise, gullwing correction voltage $V_{gc}$ represents gullwing carrier frequency voltage $V_{gcar}$ of FIG. 4b but inverted in phase. Thus, during the top half of vertical scan, voltage $V_{gc}$, during each line period, is represented by dashed-line waveform 56p of FIG. 4c. Gullwing correction voltage $V_{gc}$ waveform 56p undergoes two cycles of oscillation during the line trace interval $t_{H1}$ through $t_{H4}$ and is of the proper phase, given the relative winding polarities of windings $W_a$ and $W_b$, to enable gullwing correction circuit 70 to generate the gullwing correction current $v_c$ of FIG. 1.

During the bottom half of raster scanning after time $T_{V0}$ of FIG. 5a, when modulation voltage $V_{modv}$ is positive, gullwing correction voltage $V_{gc}$ is in phase with voltage $V_{gcar}$ and is represented by solid-line voltage waveform 56n of FIG. 4c. The oscillation of voltage waveform 56n corresponds closely to the phase inverted oscillation of gullwing correction current $-i_{Vc}$ of FIG. 1.

Vertical modulation voltage $V_{modv}$ amplitude modulates gullwing correction voltage $V_{gc}$ to produce a modulation envelope $m_{gc}$ of the correction voltage, as illustrated in FIG. 5b. The line repetitive portion of the voltage $V_{gc}$ is schematically illustrated in FIG. 5b by the closely spaced vertical line segments. The height or envelope separation of gullwing modulation envelope $m_{gc}$ undergoes two cycles of oscillation within the vertical deflection interval, time $T_a$ through time $T_b$, reaching zero envelope height near the center of vertical trace near time $T_{V0}$, and reaching near zero envelope height at the beginning and end of vertical trace near times $T_{V1}$ and $T_{V4}$, respectively.

The vertical rate amplitude modulation of modulation envelope $m_{gc}$ enables gullwing correction circuit 70 to produce a vertical rate modulation envelope $m_V$ of the gullwing correction current $i_{Vc}$ of FIG. 1 that closely corresponds to and is in-phase with the modulation envelope $m_{gc}$ of FIG. 5b.

Because modulator 50 of FIG. 3 functions as a suppressed carrier modulator, the phase of gullwing correction voltage $V_{gc}$ switches 180° near the center of vertical trace from the phase represented by waveform 56p to the phase represented by waveform 56n. This phase change enables gullwing correction circuit 70 to concurrently change the phase of gullwing correction current $i_{Vc}$ at the center of vertical trace, from $v_c$ to $-i_{Vc}$, as is required for proper gullwing distortion correction.

In accordance with an aspect of the invention, north-south pincushion correction of vertical deflection current $i_V$ is provided by a north-south pincushion correction circuit 60 that operates in conjunction with gullwing correction circuit 70. Pincushion correction circuit 60 generates north-south modulation voltage V2 that is applied in series with gullwing modulation voltage V1 to vertical deflection winding $L_V$. North-south modulation voltage V2 is a line frequency, sinusoidal voltage, phased by correction circuit 60 to have a zero crossing near the center of the horizontal trace interval. The amplitude envelope of line frequency voltage V2 is made to vary at a vertical rate in a generally sawtooth manner, having maximum envelope height near the top and bottom of the raster and zero height near the center.

To produce north-south modulation voltage V2, control circuit 61 is responsive to a line rate signal, retrace pulse voltage 23 developed by a flyback transformer 22, and a field rate signal, vertical sawtooth voltage 62. Control circuit 61 generates a line rate, bilevel, square-wave control voltage 133H. North-south pincushion correction circuit 60, including a detailed embodiment of north-south control circuit 61, is described in detail in U.S. patent application Ser. No. 719,227, filed Apr. 2, 1985, entitled North-South Pincushion Corrected Deflection Circuit by P. E. Haferl, herein incorporated by reference.

North-south control circuit 61 varies the amplitude levels 133a and 133b of line rate control voltage 133H at a vertical rate in a sawtooth manner, with level 133a varying in the opposite sense of the level 133b. North-south control voltage 133H is coupled via a buffer transistor Q7 to the base of a power amplifier Q8 operated in the class A mode. Transistor Q8 is coupled to the primary winding $W_s$ of a north-south transformer T2. The secondary winding $W_p$ of transformer T2 is coupled in series with the secondary winding $W_b$ of gullwing transformer T1 and vertical deflection winding $L_V$. Secondary winding $W_p$ of north-south transformer T2 and a capacitor $C_{17}$ form an LC resonant circuit 63 that is tuned to the line frequency.

In response to line rate, square-wave voltage 133H, power amplifier Q8 excites resonant circuit 63 into oscillation at the line rate to generate the line frequency north-south modulation voltage V2 that is applied to vertical deflection winding $L_V$. The amplitude envelope variation of voltage V2 at a vertical rate in a generally sawtooth manner is accomplished in accordance with the vertical rate variation of the levels 133a and 133b of control signal 133H.

The sinusoidal nature of north-south modulation voltage V2 advantageously assists gullwing distortion correction circuit 70 in providing the proper degree of gullwing correction. Sinewave, north-south modulation voltage V2, when applied to vertical deflection winding $L_V$, generates a cosine north-south correction current component to field deflection current $i_V$ that is phase shifted by 90° from voltage V2. Thus, with respect to line scanning instants $t_{H1}$ through $t_{H4}$ of FIG. 1, the north-south correction current component of vertical deflection current $i_V$ reaches maximum magnitude at the center of horizontal trace at time $t_{HO}$.

The cosine correction current, in addition to substantially correcting north-south pincushion distortion, also assists in correcting gullwing distortion. The north-south correction current changes its polarity at the zero crossings of the cosine current, near times $t_{H2}$ and $t_{H3}$ in FIG. 1. This change in polarity of the north-south correction current has an aiding effect to the correction provided by gullwing correction current component $i_{Vc}$ of FIG. 1.

As previously mentioned, the faceplate of a square-planar picture tube is aspherical. The faceplate curvature is relatively shallow near the center of the faceplate and increases near the edges along paths parallel to both the major and minor axes. The edges of the faceplate are nearly planar, with points along the top, bottom, right and left edges substantially located in a common plane. When providing north-south pincushion correction in conjunction with raster scanning on the aspherical faceplate of a square-planar picture tube, a linear sawtooth north-south modulation envelope leaves a residual north-south pincushion distortion, wherein, for example, too much correction amplitude is provided around the center of the raster and too little correction is provided at the top and bottom. North-south pincushion correction circuit 60 corrects such residual distortion by nonlinearly waveshaping the vertical rate correction envelope.

In accordance with an aspect of the invention, the modulation voltage $V_{modv}$ generated by vertical waveshaping circuit 80, in addition to being coupled to gullwing correction circuit 70, is also coupled to north-south control circuit 61 to nonlinearly waveshape the north-south correction current envelope. Although not shown in FIG. 3, in north-south control circuit 61, vertical rate voltage $V_{modv}$ is algebraically added to vertical rate sawtooth voltage 62 for producing a vertical rate variation of levels 133a and 133b of north-south control voltage 133H. As explained in the aforementioned Haferl application Ser. No. 719,227, control circuit 61 processes the superposed voltages to provide an envelope variation that results in a slight compression of the envelope height at the lower correction current amplitudes, when scanning the center lines of the raster, and a slight expansion of the envelope height at the higher correction current amplitudes, when scanning the top and bottom lines of the raster. This provides substantial compensation of residual north-south pincushion error in a square-planar picture tube.

Because vertical deflection amplifier 41 may exhibit significant output impedance at the line frequency, the line rate modulation of vertical deflection current $i_V$ produced by north-south pincushion correction circuit 60 tends to develop a line rate component in output voltage 42 of vertical deflection amplifier 41. Integrated circuit vertical deflection amplifiers may not permit the use of a sufficiently large supply voltage to avoid producing voltage limiting effects. The result may be a nonlinear drive at the top and bottom of field scan.

To avoid voltage limiting effects, vertical deflection winding $L_V$ is tuned to approximately the line frequency by a capacitor $C_{18}$ and a damping resistor $R_{53}$ placed in parallel with series connected vertical deflection winding $L_V$ and secondary winding $W_b$ of gullwing transformer T1. In this arrangement, the line rate north-south correction current circulates within the tuned circuit. Because the impedance of tuned circuit 43 is relatively high at the line frequency, less line rate voltage appears at the output terminal of vertical deflection amplifier 41. The inductance of gullwing transformer T1 must be included in tuned circuit 43 because the gullwing correction current frequency is different than the line frequency.

To provide both north-south pincushion and gullwing correction, modulation voltages V2 and V1 are superposed before being applied to vertical deflection winding $L_V$. This superposition is accomplished by series coupling tuned circuit 63 of transformer T2 with secondary winding $W_b$ of gullwing transformer T1.

A tuned circuit 63 is advantageously used to generate the sinusoidal north-south modulation voltage V2 because of the large voltage amplitudes needed to correct the relatively large pincushion distortion that exists in a 27V square-planar picture tube. The north-south component of vertical deflection current $i_V$ may illustratively be 10% of the deflection current, whereas the gullwing component may only be 2%. The north-south voltage V2 may reach a peak magnitude of around 80 volts, whereas the gullwing voltage V1 may only reach a peak magnitude of around 18 volts.

In accordance with a feature of the invention, secondary winding $W_b$ of gullwing transformer T1 represents a linear impedance at a main constitutent frequency of gullwing modulation voltage V1, such as at the approximately double line frequency of 38 kilohertz. By maintaining the impedance of winding $W_b$ linear in the frequency region about 38 kilohertz, undesirable interaction between gullwing transformer T1 and tuned circuit 63 of north-south transformer T2 is avoided. Since the voltage amplitude required for gullwing modulation V1 to provide proper amounts of gullwing correction is substantially less than that required by north-south modulation voltage V2, one may advantageously choose to tune transformer T2 rather than transformer T1 to generate the associated modulation voltage. Thus, a capacitor, such as capacitor $C_{17}$, is provided for tuning north-south transformer T2 to substantially the line frequency; whereas no tuning element is provided that is capable of tuning gullwing transformer T1 at the gullwing modulation frequency of approximately double line frequency.

The operation of suppressed carrier modulator 50 will now be described in detail. Modulator 50 may be advantageously used, not only in a gullwing correction circuit but also in other applications. Suppressed carrier modulator may find applications in areas that require one or more of the following: simplicity, stability, low cost, linear operation from DC, absence of wound components and avoidance of output filtering. Suppressed carrier modulator 50 combines the above features in a simple circuit using only three transistors and two diodes. As an application example, modulator 50 may be used in low frequency multipliers.

Figure 6:
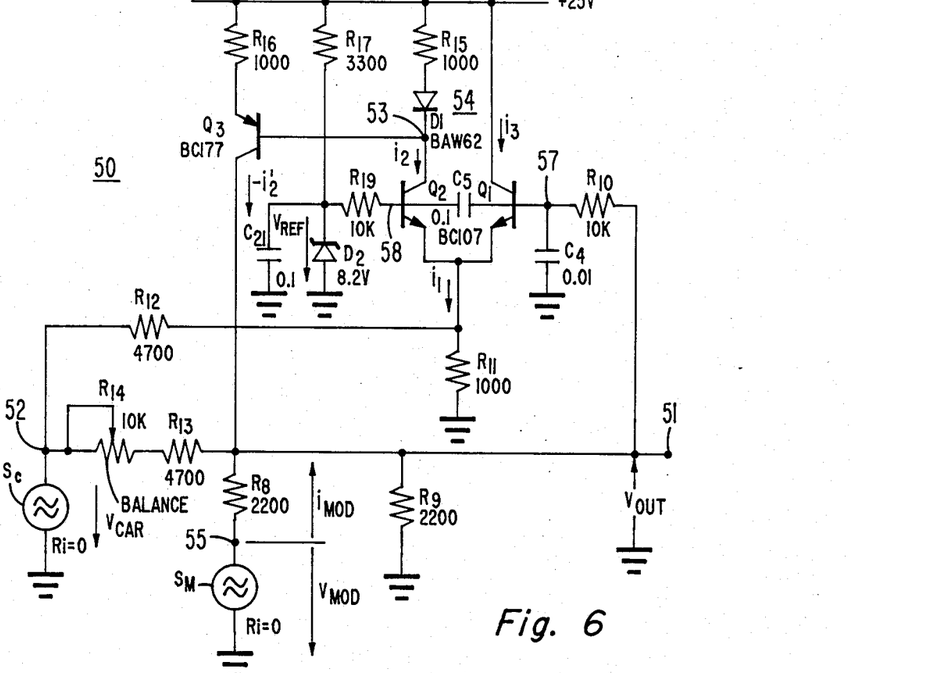
FIG. 6 illustrates the general application of the inventive suppressed carrier modulator of FIG. 3.

FIG. 6 illustrates suppressed carrier modulator 50 for the general case where the carrier voltage is a sinusoidal voltage $V_{CAR}$ developed by an ideal carrier voltage source $S_C$. Similarly, the modulation voltage is a lower frequency sinusoidal voltage $V_{MOD}$ developed by an ideal modulation voltage source $S_M$. Suppressed carrier modulator 50 of FIG. 6 includes a differential amplifier 54 comprising differentially connected transistors $Q_1$ and $Q_2$, and an inverting transistor $Q_3$ which provides negative feedback to a first input terminal 57 of differential amplifier 54 at the base of transistor $Q_1$.

To explain modulator operation, assume both voltage sources $S_C$ and $S_M$ are absent, with modulator input terminals 52 and 55 being grounded. In accordance with an inventive feature, in such a situation, differential amplifier 54 is balanced by the action of the negative feedback through transistor $Q_3$. The negative feedback from transistor $Q_3$ to input terminal 57 at the base of differential transistor $Q_1$ maintains the voltage at input terminal 57 at the reference voltage level of differential amplifier input terminal 58, at the base of transistor $Q_2$. By selecting base resistors $R_{10}$ and $R_{19}$ of equal value, the modulator output voltage $V_{OUT}$ at terminal 51 is maintained at the reference voltage $V_{REF}$ of zener diode $D_2$ in the balanced condition.

The emitter current, or differential amplifier bias current, $i_1$, of differentially connected transistors $Q_1$ and $Q_2$ divides into currents $i_2$ and $i_3$ in the collectors of transistors $Q_2$ and $Q_1$, respectively. The collector current of inverting transistor $Q_3$ mirrors, in amplitude, current $i_2$ but is inverted in phase. The collector current of transistor $Q_3$ flows as a current $-i'_2$ towards output terminal 51. Diode $D_1$ compensates for the temperature drift of the voltage across the base-emitter electrodes of transistor $Q_3$.

Figure 7:
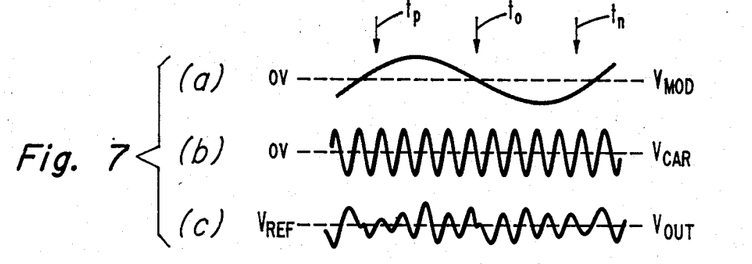
FIG. 7 illustrates waveforms associated with the operation of the circuit of FIG. 6.

Assume now that carrier voltage source $S_C$ is coupled to terminal 52 and develops at the terminal a sinusoidal carrier voltage $V_{CAR}$, illustrated in FIG. 7b. Assume also that input terminal 55 is still grounded. Carrier current developed by voltage $V_{CAR}$ flows as a component in resistor $R_{12}$ to the common junction between the emitters of differentially connected transistors $Q_1$ and $Q_2$. This carrier current component is reflected as in-phase components in collector currents $i_2$ and $i_3$ and is inverted by transistor $Q_3$ to produce an inverted carrier current component in current $-i'_2$.

The inverted carrier current component of current $-i'_2$ is algebraically summed at terminal 51 with a non-inverted carrier current component flowing via balance potentiometer $R_{14}$ and resistor $R_{13}$. By proper adjustment of potentiometer $R_{14}$, complete carrier current cancellation at terminal 51 is obtained. Since terminal 51 is the modulator output terminal at which voltage $V_{OUT}$ is developed, carrier current cancellation is equivalent to complete carrier voltage suppression at output terminal 51, in the balanced state of modulator 50.

Modulation voltage $V_{MOD}$, illustrated in FIG. 7a, unbalances differential amplifier 54. The DC voltage at summing point terminal 51 remains substantially constant by action of negative feedback current $-i_2$ 40 which varies inversely proportional to current $i_{MOD}$. The unbalance of currents $i_2$ and $i_3$ is also proportional to current $i_{MOD}$. As a result, the carrier current components of currents $i_2$ and $-i'_2$ vary inversely proportional to current $i_{MOD}$. When voltage $V_{MOD}$ is positive and increasing, such as occurs near time $t_p$ of FIG. 7, the negative feedback loop reduces current $-i'_2$ below its balanced DC level in accordance with the amplitude of voltage $V_{MOD}$. A reduction in current $-i'_2$ includes a reduction in the magnitude of the inverted carrier current component. The noninverted carrier component flowing via potentiometer $R_{14}$ and resistor $R_{13}$ is no longer calceled by the inverted carrier current component from transistor $Q_3$. A noninverted carrier current thus appears at modulator output terminal 51 as a modulated carrier frequency output voltage $V_{OUT}$ having an amplitude that varies in accordance with the amplitude variation of voltage $V_{MOD}$.

Negative going changes of voltage $V_{MOD}$ when the voltage $V_{MOD}$ is negative, such as occur near time $t_n$ of FIG. 7, have the opposite effect and result in an increase of the inverted carrier current component of current $-i'_2$.

The result of this modulation process on voltage $V_{OUT}$ is illustrated in FIG. 7c which shows voltage $V_{OUT}$ as an amplitude modulated suppressed carrier voltage. When voltage $V_{MOD}$ of FIG. 7a is zero, near time $t_0$, the carrier portion of voltage $V_{OUT}$ is suppressed.

The negative feedback loop via differential amplifier 54 and transistor $Q_3$ substantially suppresses the appearance of the baseband frequency of modulation voltage $V_{MOD}$ at output terminal 51 at all amplitude levels of the modulation voltage. The small amount of modulation voltage required to modulate the base current of transistor $Q_2$ is relatively insignificant and may be neglected from consideration.

The negative feedback loop, however, does not significantly suppress the carrier portion of voltage $V_{OUT}$. A bypass capacitor $C_4$ reduces the voltage $V_{OUT}$ at terminal 57. A capacitor $C_5$ is advantageously coupled between the two input terminals 57 and 58 of differential amplifier 54. The value of capacitor $C_5$ is selected to provide a substantially short circuited path between terminals 57 and 58 at frequencies around that of carrier voltage $V_{CAR}$. Because differential amplifier 54 exhibits a high common mode rejection, the development of a carrier current at output terminal 51, when voltage $V_{MOD}$ unbalances modulator 50, is not adversely affected by the simultaneous appearance of carrier current at input terminal 57.

Nevertheless, some common mode carrier feedback is produced when voltage $V_{MOD}$ unbalances modulator 50, because the voltage at terminals 57 and 58 modulates by a small amount current $i_1$ and the superimposed carrier current component. This may be improved by replacing resistor $R_{11}$ by a transistor arrangement operating as a current source. Resistor $R_{12}$ is then connected in a suitable way to the control terminal of this transistor current source to modulate current $i_1$ by voltage $V_{CAR}$. The frequency range and maximum available output voltage $V_{OUT}$ are significantly increased. The result is that not all of the carrier current flowing in resistor $R_{12}$ passes through transistors $Q_1$ and $Q_2$ as collector currents $i_2$ and $i_3$.

In contrast to other suppressed carrier modulators circuits, modulator 50 operates in a linear manner. Modulator output voltage $V_{OUT}$ remains undistorted, thereby avoiding the necessity of lowpass filtering the output voltage or of providing a second harmonic trap at output terminal 51. Another advantage of modulator 50 is that the carrier frequency may be varied during operation without degrading the modulation. Thus, even when the carrier frequency is not a pure sinusoidal wave, the modulated output voltage remains undegraded. These advantages are derived in part from the fact that the modulation is produced by the linear process of adding at terminal 51 a variable amount of inverted carrier signal to the noninverted carrier signal.

Figure 8:
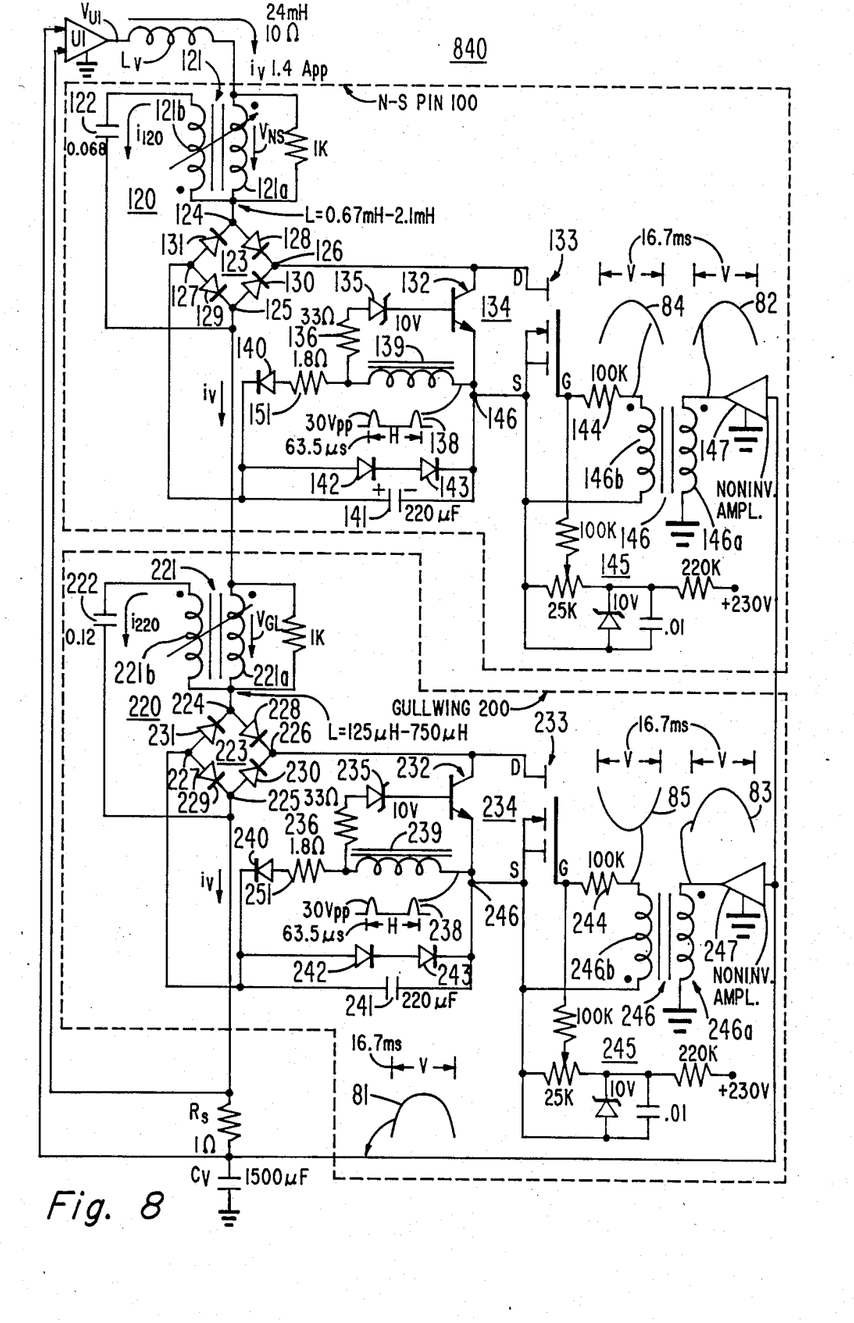
FIG. 8 illustrates an alternate vertical deflection circuit, embodying the invention, that includes different arrangements for north-south pincushion distortion and gullwing distortion correction circuits.

FIG. 8 illustrates an alternative vertical deflection circuit 840, embodying the invention, that includes different arrangements for north-south pincushion distortion and gullwing distortion correction circuits.

Such circuitry may be used when large amounts of gullwing correction is required. In FIG. 8, a vertical deflection amplifier U1, of conventional design, applies a vertical output voltage $V_{U1}$ to a vertical deflection winding $L_V$ for generating a vertical deflection current $i_V$. A north-south pincushion correction circuit 100 generates a north-south pincushion correction voltage $V_{NS}$ across a winding 121a of a north-south transformer 121. A gullwing correction circuit 200 generates a gullwing correction voltage $V_{GL}$ across a winding 221a of a gullwing transformer 221. The two modulation voltages, $V_{NS}$ and $V_{GL}$, are applied in series to vertical deflection winding $L_V$ for modulating vertical deflection current $i_v$ in accordance with the two modulation voltages, thereby providing north-south pincushion distortion and gullwing distortion correction of the scanned raster in a square-planar picture tube. After flowing from gullwing correction circuit 200, vertical deflection current $i_V$ flows to ground via a sampling resistor $R_s$ and a coupling capacitor $C_V$.

North-south pincushion correction circuit 100 includes north-south transformer 121, having winding 121a coupled to a terminal 124 of a diode steering bridge circuit 123 and having a winding 121b coupled to a resonant capacitor 122 for forming a series resonant circuit 120, coupled between bridge terminal 124 and bridge terminal 125. Series resonant circuit 120 is tuned to approximately the line frequency.

A north-south modulator current switch 134, comprising a bipolar transistor 132 and a field effect transistor 133 is coupled between bridge terminal 126 and bridge terminal 127. The connection from bridge terminal 127 to the junction terminal 146 of the emitter electrode of transistor 132 and the source electrode of transistor 133 is provided alternately during horizontal retrace and horizontal trace by the branch path of a relatively large valued capacitor 141 during horizontal retrace and during horizontal trace by the series connection of a horizontal flyback transformer secondary winding 139, a small valued resistor 139 and a diode 140.

Transistor 132 is switched at a line rate by a retrace pulse voltage 138 developed across horizontal flyback transformer secondary winding 139, with retrace pulse voltage 138 being positive during horizontal retrace at terminal 146. A zener diode 135 and a resistor 136 limit the base current and reverse base voltage of transistor 132.

Conduction in field effect transistor 133 is varied at a vertical rate in a parabolical manner by a vertical rate control voltage 84 coupled to the gate electrode of the transistor. Parabolic control voltage 84 is generated from a parabolic voltage 81, developed across coupling capacitor $C_V$. Parabolic voltage 81 is amplified by a noninverting amplifier 147 to apply an in-phase parabolic voltage 82 to the dotted terminal of primary winding 146a of a control transformer 146. The dotted terminal of transformer secondary winding 146b is coupled to the gate electrode of field effect transistor 133 via a resistor 144. The undotted terminal of secondary winding 146b is coupled to the source electrode. Bias for the gate electrode is provided by a DC bias source 145.

The relative winding polarities of windings 146a and 146b are such as to produce a parabolic control voltage 84 that is in-phase with voltage 81 of coupling capacitor $C_V$. Thus parabolic voltage 84 achieves maximum amplitude near the center of vertical scan and near minimum amplitude at the top and bottom of vertical scan.

To describe operation of north-south pincushion correction circuit 100, assume that the top of the raster is being scanned and that a positive vertical deflection current $i_V$ flows into the dotted terminal of winding 121a of north-south transformer 121. During the horizontal retrace interval of a given line scan, retrace pulse voltage 138 reverse biases the base-emitter junction of bipolar transistor 132, cutting off collector conduction.

Vertical deflection current $i_V$, flowing out of the undotted terminal of winding 121a divides into two current branches. A first branch path for vertical deflection current $i_V$ is via north-south transformer winding 121b and capacitor 122 of series resonant circuit 120. A second branch path for vertical deflection current $i_V$ is via current steering diode 128 of diode bridge 123, the drain-to-source current path of field effect transistor 133, capacitor 141 and steering diode 129. The two branch currents of vertical deflection current $i_V$ recombine at the dotted terminal of gullwing transformer winding 221a.

During horizontal retrace, the portion of vertical deflection current $i_V$ that flows in series resonant circuit 120 stores energy in north-south transformer winding 121b and in capacitor 122. The amount of current flowing and energy stored in series resonant circuit 120 is inversely related to the magnitude of vertical deflection current $i_V$ that branches from the undotted terminal of winding 121a to field effect transistor 133. In accordance with an aspect of the invention, by controlling the conductivity of field effect transistor 133, the amount of current in series resonant circuit 120 is controlled in a inverse manner.

During the horizontal trace interval, horizontal pulse voltage 138 forward biases the base-emitter junction of bipolar transistor 132 producing saturated collector conduction. Saturated conduction in transistor 132 provides a substantial short circuit path, via the transistor between diode bridge terminals 126 and 127 via the short circuit path of horizontal flyback transformer winding 138, low valued resistors 139 and diode 140.

With terminals 126 and 127 short circuited to one another, series resonant circuit 120 undergoes current and voltage oscillation at its resonant frequency of approximately the line frequency. A sinusoidal voltage is developed across north-south transformer winding 121b that is transformer coupled to winding 121a and applied to vertical deflection winding $L_V$ as the voltage $V_{NS}$, for generating a cosinusoidal correction current component to vertical deflection current $i_V$. Adjusting the inductance of north-south transformer 121 adjusts the phasing and frequency of the oscillation to produce a maximum cosinusoidal correction current at the center of the horizontal trace interval.

Figure 9:
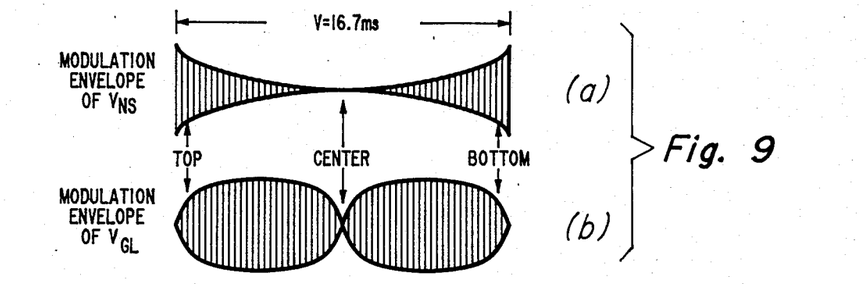
FIG. 9 illustrates waveforms associated with the operation of the circuit of FIG. 8.

The amplitude of the resonant oscillation during horizontal trace is a function of the amount of energy stored in series resonant circuit 120 during the previous horizontal retrace interval. Since the amount of energy stored is inversely related to the conduction of field effect transistor 133, proper amplitude modulation of north-south pincushion correction voltage $V_{NS}$ is provided by applying vertical rate parabolic control voltage 84 to the gate electrode of field effect transistor 133. Patabolic voltage 84 is maximum at the center of vertical trace and is near minimum at the top and bottom of vertical trace. Because of the inverse relationship between conduction in field effect transistor 133 and the amplitude of north-south pincushion correction voltage $V_{NS}$, the modulation envelope of voltage $V_{NS}$, illustrated in FIG. 9a, is near maximum envelope height at the top and bottom of the raster and is zero height near the center of the raster. The use of a parabolic control voltage for north-south correction provides additional envelope waveshaping that further increases envelope height near the top and bottom of the raster to produce a better north-south envelope waveform when raster scanning the faceplate of a square-planar picture tube.

During the bottom half of raster scan, when vertical deflection current $i_V$ is negative, current steering diodes 130 and 131 of diode bridge 123 conduct, during the horizontal retrace interval, the branch of vertical deflection current $i_V$ that flows in field effect transistor 133. When vertical deflection current $i_V$ is negative, the current $i_{120}$ that flows in series resonant circuit 120 during the horizontal retrace interval, flows from capacitor 122 to the undotted terminal of north-south transformer winding 121b, a current direction that is opposite that of the direction taken during the top half of raster scan. Thus, during the bottom half of raster scan, the phase of north-south pincushion correction voltage $V_{NS}$ is switched by 180° from the phase that the voltage takes during the top half of raster scan.

Diode 140 coupled in series with a current limiting resistor 139 rectifies retrace pulse voltage 138 during the horizontal trace interval to develop a voltage across capacitor 141 equal in magnitude to the two diode voltage drops that are produced by diodes 142 and 143 when these two diodes are conducting. The two diode voltage drop thereby produced between terminals 127 and 146 compensates for the two diode voltage drop developed between terminals 124 and 125 during diode bridge conduction that tends to cause vertical deflection current distortion near the center of vertical trace.

Gullwing correction circuit 200 is designed similarly to north-south pincushion correction circuit 100, using similar elements and operating in a similar fashion. Gullwing circuit 200 includes a gullwing transformer 221 having a winding 221a in which vertical deflection current $i_V$ flows, a current steering, diode bridge 223, a series resonant circuit 220, comprising gullwing transformer winding 221b and a resonant capacitor 222, coupled between bridge terminals 224 and 225, and a gullwing modulator current switch 234, comprising a bipolar transistor 232 and a field effect transistor 233.

During horizontal retrace, retrace pulse voltage 238 reverse biases the base-emitter junction of bipolar transistor 232, cutting off collector conduction. Vertical deflection current $i_V$ divides into two branches at the undotted terminal of gullwing transformer winding 221a and recombines at current sampling resistor $R_s$. Vertical deflection current $i_V$ flows in a first branch including field effect transistor 233 and in a second branch, including in series resonant circuit 220. The amount of current flowing and energy stored in series resonant circuit 220 is inversely related to the conduction of field effect transistor 233.

During the subsequent horizontal trace interval, retrace pulse voltage 238 forward biases transistor 232 into saturated collector conduction, initiating a resonant oscillation in series resonant circuit 220 at the resonant frequency of approximately double line frequency. Approximately two oscillations of current and voltage are produced during the horizontal trace interval in gullwing transformer winding 221b. The oscillatory voltage across winding 221b is transformer coupled to winding 221a as the approximately double line rate, oscillatory gullwing correction voltage $V_{GL}$ that is applied to vertical deflection winding $L_V$. Oscillatory voltage $V_{GL}$ generates a generally sinsuoidal gullwing correction current component in vertical deflection winding $i_V$ at approximately at the double line rate. The inductance of transformer 221 is adjusted to provide the proper gullwing correction current component frequency and to properly phase the gullwing correction current component within the horizontal trace interval.

To provide accurate gullwing correction from the top of raster scan to the bottom of raster scan, the modulation envelope of gullwing correction voltage $V_{GL}$ should ideally be near zero height not only when scanning the center raster lines but also when scanning both the top and bottom raster lines, as illustrated in FIG. 9b. Maximum modulation envelope height of gullwing correction voltage $V_{GL}$ should ideally occur at points intermediate the center and top or bottom of the raster scan.

To provide the gullwing modulation envelope waveshape illustrated in FIG. 9b, wherein the height of the modulation envelope undergoes substantially two cycles of oscillation during the vertical deflection interval, a gullwing correction control voltage 85 is applied to the gate electrode of field effect transistor 233 to vary, in accordance with the control voltage, the transistor conductivity. Control voltage 85 is a vertical rate parabola waveform derived from the vertical rate parabola voltage 81 developed across coupling capacitor $C_V$ and applied to noninverting amplifier 247 that generate a noninverted parabolic output voltage 83. Voltage 83 is applied to the dotted terminal of primary winding 246a of control transformer 246 to generate parabola voltage 85.

The winding polarity of transformer secondary winding 246b is such as to invert the phase of parabola 85 relative to the phase of parabola 81. This results in the phase of parabola 85 also being inverted relative to the phase of parabola 84 of north-south pincushion correction circuit 100. Thus, parabolic gullwing control voltage 85 is of minimum amplitude at the center of vertical scan and near maximum amplitude near the top and bottom of vertical scan. Parabolic gullwing control voltage 85 is advantageously used to vary the conduction of field effect transistor 233 in a parabolic manner. Maximum transistor conduction is achieved at the top and bottom of vertical scan and minimum conduction is achieved at the center of vertical scan.

Maximum conduction of field effect transistor 233 at the top and bottom of vertical scan results in minimum vertical deflection current flowing in series resonant circuit 220 during the corresponding horizontal retrace intervals that occur near those vertical scan instants. With minimum current flowing and energy stored in series resonant circuit 220 at the top and bottom of vertical scan, the current and voltage oscillation in series resonant circuit 220 during the corresponding horizontal trace intervals are minimum, as is required for gullwing correction. Near the center of vertical scan, conduction in field effect transistor 233 is at a minimum. However, because north-south pincushion corrected vertical deflection current $i_V$ is zero at the center of vertical scan, no current flows into series resonant circuit 220 to produce resonant oscillations. Thus, the modulation envelope of gullwing correction voltage $V_{GL}$ is also zero at the center of vertical scan, as is required for proper gullwing distortion correction.

During the bottom half of raster scan, when vertical deflection current $i_V$ is negative, current steering diodes 230 and 231 of diode bridge 223 conduct, during the horizontal retrace interval, the branch of vertical deflection current $i_V$ that flows in field effect transistor 233. When vertical deflection current $i_V$ is negative, the current $i_{220}$, that flows in series resonant circuit 220 during the horizontal retrace interval, flows from capacitor 222 to the dotted terminal of gullwing transformer winding 221b, a current direction that is opposite that of the direction taken during the top half of raster scan. Thus, during the bottom half of raster scan, the phase of gullwing correction voltage $V_{GL}$ is switched by 180° from the phase that the voltage takes during the top half of raster scan.

What is claimed:

1. Picture tube display apparatus with gullwing raster distortion correction, comprising:
 a picture tube having a phosphor screen located on an aspherical faceplate of relatively flat contour;
 line and field deflection circuits for generating line and field deflection currents in respective line and field deflection windings to scan a raster on said phosphor screen, said raster thereby being subject to gullwing distortion; and
 gullwing distortion correction means responsive to a first signal repeating at a line rate and to a second signal repeating at a field rate for modulating said field deflection current during a line deflection period within the field deflection trace interval in a manner that produces gullwing distortion correction of the corresponding raster scan line.

2. Apparatus according to claim 1 wherein said gullwing distortion correction means modulates said field deflection current to produce approximately two cycles of modulation during said line deflection interval.

3. Apparatus according to claim 2 wherein said gullwing distortion correction means varies the modulation envelope of said field deflection current in a manner that produces approximately two cycles of oscillation of the envelope height within said field deflection trace interval.

4. Apparatus according to claim 1 wherein said gullwing distortion correction means includes a suppressed carrier modulator for developing a gullwing correction voltage that is applied to said field deflection circuit and that is representative of the modulation of the line rate repetitive first signal by the field rate repetitive second signal.

5. Apparatus according to claim 4 wherein said gullwing distortion correction means includes a transformer with a first winding having said output voltage developed thereacross and with a second winding coupled to said field deflection winding.

6. Apparatus according to claim 5 including an amplifier having an output coupled to said transformer first winding and being responsive to an output of said suppressed carrier modulator.

7. Apparatus according to claim 1 wherein said gullwing distortion correction means comprises means for generating a gullwing correction output voltage that is representative of the modulation of the line rate repetitive first signal by the field rate repetitive second signal and a gullwing transformer having said output voltage applied to a first winding thereof and having a second winding coupled to said field deflection winding.

8. Apparatus according to claim 7 including a north-south pincushion correction circuit comprising a north-south control circuit for generating a north-south correction output voltage and a north-south transformer having said north-south correction output voltage applied to a first winding thereof and having a second winding coupled to said field deflection winding.

9. Apparatus according to claim 8 wherein said north-south correction output voltage includes an approximately line rate constitutent frequency and said gullwing correction output voltage includes an approximately double line rate constituent frequency and wherein said north-south correction circuit includes means for tuning said north-south transformer to said approximately line rate constitutent frequency, whereas said gullwing transformer remains untuned at said approximately double line rate constitutent frequency.

10. Apparatus according to claim 1 wherein said second signal comprises an oscillatory signal at said field rate phased to produce near zero amplitude at the top, bottom and center of field scan.

11. Apparatus according to claim 10 wherein said first signal comprises an approximately double line rate signal.

12. Apparatus according to claim 1 including means for generating said first signal comprising an LC resonant circuit coupled to said line deflection winding and tuned to produce approximately two complete cycles of voltage oscillation during the line trace interval.

13. Apparatus according to claim 12 wherein said LC resonant circuit undergoes approximately one cycle of voltage oscillation during the line retrace interval.

14. Apparatus according to claim 12 wherein said gullwing distortion correction means includes a modulator for developing an output voltage that is applied to said field deflection circuit and that is representative of the modulation of said first signal by said second signal.

15. Apparatus according to claim 14 wherein said second signal comprises an oscillatory signal at said field rate phased to produce near zero amplitude at the top, bottom and center of field scan.

16. Apparatus according to claim 4 including first and second voltage generating means for generating said first and second signals as first and second signal voltages, respectively, and wherein said suppressed carrier modulator comprises a differential amplifier, means coupled to said first voltage generator and to said differential amplifier for controlling the amplifier bias current in accordance with said line rate repetitive first signal voltage, means for forming a negative feedback path between a differential amplifier output terminal and a differential amplifier input terminal and including means for generating an inverted amplifier output voltage that is representative of an amplifier input voltage, and means for superposing said inverted amplifier output voltage and said first and second signal voltages to generate said gullwing correction voltage.

17. Apparatus according to claim 16 wherein said negative feedback path includes means for applying said gullwing correction voltage to said first input terminal of said differential amplifier and a capacitor coupled to said first input terminal and to a second input terminal of said differential amplifier to provide said differential amplifier with common mode rejection of the line rate repetitive first signal voltage portion of said gullwing correction voltage.

18. Apparatus according to claim 16 including a source of reference voltage coupled to said differential amplifier, said negative feedback path maintaining said differential amplifier in a balanced state in accordance with said reference voltage.

19. Apparatus according to claim 18 wherein said superposing means provides cancellation of the line rate repetitive first signal voltage portion of said gullwing correction voltage when said differential amplifier is in said balanced state.

20. Apparatus according to claim 19 wherein said field rate repetitive second signal voltage unbalances said differential amplifier to develop said line rate repetitive first signal voltage portion of said gullwing correction voltage that is modulated in accordance with the amplitude of said field rate repetitive second signal voltage.

21. Apparatus according to claim 20 wherein said negative feedback path includes means for applying said gullwing correction voltage to said first input terminal of said differential amplifier and a capacitor coupled to said first input terminal and to a second input terminal of said differential amplifier to provide said differential amplifier with common mode rejection of the line rate repetitive first signal voltage portion of said gullwing correction voltage.

22. Apparatus according to claim 1 wherein said gullwing distortion correction means comprises an inductance coupled to said field deflection winding, a resonating capacitance coupled to said inductance for forming a resonant circuit tuned to approximately double the line frequency, and a controllable switch coupled to said inductance and responsive to a line rate switch control signal and to said field rate repetitive second signal for producing conduction in said switch, during the line retrace interval of said line deflection period, that varies in accordance with said field rate repetitive first signal.

23. Apparatus according to claim 22 wherein a portion of said field deflection current flows in said resonant circuit in an inverse relationship to the conductivity of said controllable switch during said line retrace interval.

24. Apparatus according to claim 23 wherein said controllable switch comprises a first controllable current element operated only at a line rate and a second controllable current element operated only at a field rate.

25. Apparatus according to claim 22 wherein said controllable switch produces oscillation of said resonant circuit during the line trace interval that is modulated in accordance with said field rate repetitive second signal to produce substantially no oscillation near the beginning and end of said field deflection trace interval.

26. Apparatus according to claim 25 wherein a portion of said field deflection current flows in said resonant circuit in an inverse relationship to the conductivity of said controllable switch during said line retrace interval.

27. Apparatus according to claim 25 wherein said field rate repetitive second signal is of substantially parabolic waveshape.

28. Apparatus according to claim 22 including a north-south pincushion distortion correction means coupled to said field deflection winding and responsive to field and line rate north-south control signals for modulating said field deflection current during a line deflection period within the field deflection trace interval in a manner that produces north-south pincushion distortion correction of the corresponding raster line.

29. Apparatus according to claim 28 wherein both said field rate repetitive second signal and said field rate north-south control signal are of substantially parabolic waveshape.

30. Apparatus according to claim 28 wherein said north-south pincushion distortion correction means comprises an inductance coupled to said field deflection winding, a resonating capacitance coupled to said inductance for forming a resonant circuit tuned to approximately the line frequency, and a controllable switch coupled to said inductance and responsive to said field and line rate north-south correction signals for producing conduction in said switch, during the line retrace interval of said line deflection period, that varies in accordance with said field rate north-south correction signal.

31. Apparatus according to claim 30 wherein both said field rate repetitive second signal and said field rate north-south control signal are of substantially parabolic waveshape.

* * * * *

UNITED STATES PATENT AND TRADEMARK OFFICE
CERTIFICATE OF CORRECTION

PATENT NO. : 4,682,085

DATED : July 21, 1987

INVENTOR(S) : PETER EDUARD HAFERL ET AL

It is certified that error appears in the above-identified patent and that said Letters Patent is hereby corrected as shown below:

Column 3, line 25, that portion reading "a" should read --to--.
Column 3, line 33, that portion reading "$-i_{vc}$" should read --$\pm i_{vc}$--. Column 4, line 64, that portion reading "$T_{HO}$" should read -- $t_{HO}$ --. Column 5, line 43, that portion reading "$V_c$" should read -- $+i_{vc}$ --. Column 6, line 10, that portion reading "$V_c$" should read --$+i_{vc}$--. Column 9, line 40, that portion reading "$-i_2$" should read -- $-i_2'$ --. Column 9, line 66, that portion reading "calceled" should read --canceled--. Column 12, line 63, that portion reading "patabolic" should read --parabolic--.

Signed and Sealed this

Twenty-third Day of August, 1988

Attest:

DONALD J. QUIGG

Attesting Officer — Commissioner of Patents and Trademarks